United States Patent Office 2,715,100
Patented Aug. 9, 1955

2,715,100

ACETYLENE SOLUTION

John D. Christian, Texas City, Tex., assignor to Monsanto Chemical Company, St. Louis, Mo., a corporation of Delaware No Drawing. Application November 8, 1952, Serial No. 319,619

12 Claims. (Cl. 252—1)

This invention relates to acetylene and more specifically to acetylene solutions. This invention also relates to the recovery of acetylene from an acetylene containing gas by means of a selective solvent.

It is known in the art that various organic compounds have shown utility as selective solvents for acetylene, thereby affording means for storing acetylene in the form of solutions of acetylene in these solvents and means of extracting acetylene from gas mixtures or increasing the acetylene content of such gas mixtures.

It is an object of this invention to provide a class of solvents having exceptional utility in the aforementioned applications. Other objects will become apparent from the description of this invention.

It has now been discovered that tetrahydrofuran, monoalkyl substituted tetrahydrofuran and dialkyl substituted tetrahydrofuran, wherein the alkyl groups contain from 1 to 4 carbon atoms, are excellent solvents for acetylene.

The Bunsen coefficients (volume of gas, measured at 0° C. and 760 mm. Hg, dissolved, at the temperature of the experiment, in one volume of solvent at a gas partial pressure of 760 mm. Hg) for acetylene in these solvents indicate their excellent solvent action for acetylene. The Bunsen coefficients ($a_0$) were determined in the following manner:

A quantity of acetylene was introduced into a calibrated flask and its initial pressure $p_i$ (measured to ±0.05 mm. Hg), initial volume $V_i$ (measured to ±0.05 ml.), and initial temperature $T_i$ (measured to ±0.02° C.) determined. A quantity of solvent was then added to a second calibrated flask and its volume $ml_s$ and vapor pressure $P_s$ determined. The acetylene was then transferred to the flask containing the solvent and, after agitation, the temperature of the liquid brought to a temperature of 25°±0.005° C. and the temperature of the gas brought to a temperature of 25.3°±0.05° C. The pressure $p_f$ of the gas, volume $V_f$ of the gas and temperature $T_f$ of the gas were then determined. $a_0$ was then calculated as follows:

$$\alpha = \frac{273.2}{760\ ml_s}\left(\frac{p_i V_i}{T_i Z_i} - \frac{(p_f - p_s)V_F}{T_f Z_f}\right)$$

where $$Z_i = \frac{80,000 - p_i}{80,000}$$

$$Z_f = \frac{80,000 - (p_f - p_s)}{p_f - p_s}$$

$$p_s = x_s P_s$$

$$x_s = \frac{22,400 d_s}{22,400\ d_s + \alpha_0 MW_s}$$

where $d_s$ = density of solvent at 25° C.

$MW_s$ = molecular weight of solvent $$\alpha_0 = \frac{\alpha 760 Z_f}{p_f - p_s}$$

In accordance with the procedure outlined above, the Bunsen coefficient for acetylene at 25° C. in tetrahydrofuran was found to be 17.98, the Bunsen coefficient for acetylene at 25° C. in 2-methyl tetrahydrofuran was 12.96 and the Bunsen coefficient for acetylene at 25° C. in 2,5-dimethyl tetrahydrofuran was 9.52. Correspondingly high Bunsen coefficients for acetylene are to be found in the following tetrahydrofurans:

3-methyl tetrahydrofuran
3-ethyl tetrahydrofuran
2-ethyl tetrahydrofuran
2-propyl tetrahydrofuran
3-propyl tetrahydrofuran
2-isopropyl tetrahydrofuran
2-butyl tetrahydrofuran
3-butyl tetrahydrofuran
2,5-diethyl tetrahydrofuran
2,5-dipropyl tetrahydrofuran
2,5-dibutyl tetrahydrofuran
3,4-diethyl tetrahydrofuran
2,3-diethyl tetrahydrofuran
3,4-dipropyl tetrahydrofuran
2,4-dibutyl tetrahydrofuran
2-methyl-5-ethyl tetrahydrofuran
2-methyl-3-ethyl tetrahydrofuran According to this invention, these solvents are most efficiently used in the extraction of acetylene from diluted acetylene such as is obtained by the partial oxidation of low molecular weight hydrocarbons. As an example, dilute acetylene obtained from the partial oxidation of methane with oxygen has the following composition:

| | Per cent |
|---|---|
| $C_2H_2$ | 8.5 |
| $H_2$ | 51.4 |
| N | 1.6 |
| CO | 26.3 |
| $CH_4$ | 5.8 |
| $CO_2$ | 5.9 |
| $C_2H_4$ | 0.1 |
| Heavier acetylenes | 0.4 |

This gas stream is treated under pressure with the aforementioned solvents in any convenient manner well known to those skilled in the art as, for example, by countercurrent absorption in a suitable column. The solution of acetylene is then transferred to a suitable desorption column where the pressure is released and the temperature raised. Concentrated acetylene is thus obtained and any contamination of the acetylene with the solvent is so small as to be insignificant.

In addition to the utility of these solvents in the extraction of acetylene from diluted acetylene, the Bunsen coefficients of these solvents clearly indicate that they are particularly suited for storing acetylene under elevated pressures.

The solvents described herein may be used per se, or they may be used in mixtures with other acetylene solvents.

What is claimed is:

1. A composition of matter comprising a solution of acetylene in a compound selected from the group consisting of tetrahydrofuran, monoalkyl substituted tetrahydrofuran and dialkyl substituted tetrahydrofurans, wherein the alkyl groups contain from 1 to 4 carbon atoms.

2. A composition of matter comprising a solution of acetylene in a monoalkyl substituted tetrahydrofuran, wherein the alkyl group contains from 1 to 4 carbon atoms.

3. A composition of matter comprising a solution of acetylene in a methyl tetrahydrofuran.

4. A composition of matter comprising a solution of acetylene in 2-methyl tetrahydrofuran.

5. A composition of matter comprising a solution of acetylene in a dimethyl substituted tetrahydrofuran.

6. A composition of matter comprising a solution of acetylene in 2,5-dimethyl tetrahydrofuran.

7. In a process for the recovery of acetylene from an acetylene containing gas, the step of treating said gas with a compound selected from the group consisting of tetrahydrofuran, monoalkyl substituted tetrahydrofurans, and dialkyl substituted tetrahydrofurans, wherein the alkyl groups contain from 1 to 4 carbon atoms.

8. In a process for the recovery of acetylene from an acetylene containing gas, the step of treating said gas with a monoalkyl substituted tetrahydrofuran, wherein the alkyl group contains from 1 to 4 carbon atoms.

9. In a process for the recovery of acetylene from an acetylene containing gas, the step of treating said gas with a methyl tetrahydrofuran.

10. In a process for the recovery of acetylene from an acetylene containing gas, the step of treating said gas with 2-methyl tetrahydrofuran.

11. In a process for the recovery of acetylene from an acetylene containing gas, the step of treating said gas with a dimethyl substituted tetrahydrofuran.

12. In a process for the recovery of acetylene from an acetylene containing gas, the step of treating said gas with 2,5-dimethyl tetrahydrofuran.

References Cited in the file of this patent

UNITED STATES PATENTS 2,424,987     Isham _____ Aug. 5, 1947